(12) United States Patent
Achten et al.

(10) Patent No.: US 11,835,103 B2
(45) Date of Patent: Dec. 5, 2023

(54) DEFORMABLE BODY AND METHOD FOR THE PRODUCTION THEREOF

(71) Applicant: Covestro Deutschland AG, Leverkusen (DE)

(72) Inventors: Dirk Achten, Leverkusen (DE); Thomas Buesgen, Leverkusen (DE); Nicolas Degiorgio, Krefeld (DE); Jonas Kuenzel, Leverkusen (DE); Ting Liu, Cologne (DE); Maximilian Wolf, Cologne (DE)

(73) Assignee: STRATASYS, INC., Eden Prairie, MN (US)

( * ) Notice: Subject to any disclaimer, the term of this patent is extended or adjusted under 35 U.S.C. 154(b) by 542 days.

(21) Appl. No.: 16/761,925

(22) PCT Filed: Nov. 23, 2018

(86) PCT No.: PCT/EP2018/082428
§ 371 (c)(1),
(2) Date: May 6, 2020

(87) PCT Pub. No.: WO2019/101955
PCT Pub. Date: May 31, 2019

(65) Prior Publication Data
US 2020/0325951 A1      Oct. 15, 2020

(30) Foreign Application Priority Data
Nov. 27, 2017     (EP) ..................................... 17203794

(51) Int. Cl.
*F16F 1/32*      (2006.01)
*B29C 64/106*      (2017.01)
(Continued)

(52) U.S. Cl.
CPC ............ *F16F 1/328* (2013.01); *B29C 64/106* (2017.08); *F16F 3/023* (2013.01); *A47C 27/063* (2013.01);
(Continued)

(58) Field of Classification Search
CPC ......... F16F 1/328; F16F 3/023; B29C 64/106; B33Y 10/00; A47C 27/063; A47C 27/065; B60N 2/7094
(Continued)

(56) References Cited

U.S. PATENT DOCUMENTS 2,678,685 A * 5/1954 Volsk ...................... F16F 1/025
                                                                      5/255
4,901,987 A * 2/1990 Greenhill .................. F16F 1/06
                                                                      267/182
(Continued)

FOREIGN PATENT DOCUMENTS

DE          2901774 A1     7/1980
DE     102011010047 A1    12/2011
(Continued)

OTHER PUBLICATIONS

WO2016/155936A2 (Jorg et al.) (Oct. 6, 2016) (machine translation) (Year: 2016).*
(Continued)

*Primary Examiner* — Mahmoud Gimie
(74) *Attorney, Agent, or Firm* — Faegre Drinker Biddle & Reath LLP

(57) ABSTRACT

A deformable body, wherein the body is constructed from a multiplicity of layers of a polymer construction material and in which a construction direction is defined perpendicular to the layers. The body preferably comprises layers with a multiplicity of curve pairs (10) which are formed by the (Continued)

construction material and which run in the same direction as one another, the curve pairs comprise in each case two periodic curves (20, 30) running oppositely with respect to one another, and the curve pairs comprise portions of maximum spacing to one another (40, 41, 60, 61) and portions of minimum spacing to one another (50, 51, 70, 71). In one part of the layers, in adjacent curve pairs (10), at least one portion of maximum spacing (41) of one curve is connected to a portion of maximum spacing (60) of an adjacent curve, in a further part of the layers, in adjacent curve pairs (10), at least one portion of maximum spacing (41) of one curve is not connected to a portion of maximum spacing (60) of an adjacent curve, in a further part of the layers, in adjacent curve pairs (10), at least a part of the portions of minimum spacing (50, 51) are connected to one another, and in a further part of the layers, in adjacent curve pairs (10), at least a part of the portions of minimum spacing (50, 51) are not connected to one another. The invention also relates to a method for producing the body and to a device for supporting and/or bearing a person having the body according to the invention. The boy may be used inter alia as a mattress or as a vehicle seat.

16 Claims, 12 Drawing Sheets

(51) Int. Cl.
*F16F 3/02* (2006.01)
*A47C 27/06* (2006.01)
*B33Y 10/00* (2015.01)
*B33Y 80/00* (2015.01)
*B60N 2/70* (2006.01)

(52) U.S. Cl.
CPC ............. *A47C 27/065* (2013.01); *B33Y 10/00* (2014.12); *B33Y 80/00* (2014.12); *B60N 2/7094* (2013.01)

(58) Field of Classification Search
USPC ........................................... 426/156; 428/156
See application file for complete search history.

(56) References Cited

U.S. PATENT DOCUMENTS

| | | | | |
|---|---|---|---|---|
| 5,558,393 | A | * | 9/1996 | Hawkins ................ F16F 1/328 |
| | | | | 267/164 |
| 5,747,140 | A | * | 5/1998 | Heerklotz ............ A47C 27/15 |
| | | | | 428/184 |
| 6,068,250 | A | * | 5/2000 | Hawkins ................ F16F 1/328 |
| | | | | 267/164 |
| 6,355,762 | B1 | | 3/2002 | Kaufhold et al. |
| 6,758,465 | B1 | * | 7/2004 | Greenhill ................. F16F 1/06 |
| | | | | 267/162 |
| 7,793,923 | B2 | * | 9/2010 | Suzuki .................... F16F 1/328 |
| | | | | 267/180 |
| 10,271,661 | B2 | * | 4/2019 | DeFranks ............. A47C 23/02 |
| 2010/0071136 | A1 | * | 3/2010 | Weber .................. A47G 9/1081 |
| | | | | 156/251 |
| 2013/0096887 | A1 | * | 4/2013 | Fee ........................ F16F 1/3605 |
| | | | | 267/153 |
| 2015/0308533 | A1 | * | 10/2015 | DeFranks ............... F16F 1/025 |
| | | | | 267/144 |

FOREIGN PATENT DOCUMENTS

DE 102015100816 B3 12/2015
WO WO-2016155936 A2 * 10/2016 ........... B29C 64/153

OTHER PUBLICATIONS

International Search Report, PCT/EP2018/082428, dated Jan. 8, 2019, Authorized officer: Pál Kis.

* cited by examiner

DEFORMABLE BODY AND METHOD FOR THE PRODUCTION THEREOF

CROSS-REFERENCE TO RELATED APPLICATION

This application is a national stage application under 35 U.S.C. § 371 of PCT/EP2018/082428, filed Nov. 23, 2018, which claims the benefit of European Application No. 17203794, filed Nov. 27, 2017, each of which is incorporated herein by reference.

FIELD

The present invention relates to a deformable body, where the body is composed of a plurality of layers of a polymeric construction material and where a construction direction perpendicular to the layers is defined. The body comprises layers with a plurality of curve pairs which are formed by the construction material and which are in periodic contact with one another. The invention further relates to a process for production of said body, and to a device for supporting and/or bearing a person, with the body of the invention. The body can be used inter alia as mattress or as vehicle seat.

BACKGROUND

Elements for supporting or bearing purposes can by way of example be configured as mattresses. Such mattresses typically consist of foam materials, and in particular the mattresses here can consist of a plurality of mutually superposed foam layers. The comfort provided by such mattresses is conventionally increased by what is known as zoning. This zoning is achieved by forming zones with different resilience properties, i.e. with different softness, distributed across the area of the mattress. This takes account of the fact that the softness required from a mattress by way of example in the leg region differs from that required in the torso region. This zoning is typically achieved in multilayer mattresses by using oscillating blades to produce cavities in parts of a middle layer of such mattresses. Upper and lower mattress layers comprising no cavities are then respectively applied to the upper and lower side of said middle mattress layer.

DE 10 2015 100 816 B3 discloses a process for the production of a body-supporting element composed of a mattress, of a cushion, of a seat, or of a portion of a seat, comprising the steps of definition of print data representing a three-dimensional supportive structure specific to a particular person and of use of a 3D printer for the production of the body-supporting element on the basis of the print data. The 3D printer can use the print data to produce regions of different resilience via formation of cavities of different sizes and/or in different numbers.

DE 10 2011 010 047 A1 relates to a one-piece plastics molding composed entirely of the same material, where the plastics molding comprises a large number of elastically deformable springing elements coupled to one another and having defined shape, where the elastic deformability of the plastics molding can be determined by the design of the spring elements.

An important criteria for the perceived comfort provided by a body-supporting element, for example a mattress or a cushion, is the extent to which the material of the element permits, throughout the entire element, free exchange of air with surrounding air. Without this exchange of air, heat from the human body could not be dissipated, and would lead to increased sweating; it would also be impossible to remove air containing moisture from human sweat, or from any washing procedure.

SUMMARY

It is an object of the present invention to overcome, at least to an extent, at least one disadvantage of the prior art. Another object of the present invention is to provide a deformable body which is suitable for the bearing of perspiring bodies and which permits exchange of air (in order to provide maximized comfort to the perspiring body). Another object of the invention was to provide a deformable body which exhibits deformation behavior that differs with direction of deformation. Another object of the invention was to permit production of such a body with maximum efficiency and/or in individualized manner and/or with conservation of resources.

BRIEF DESCRIPTION OF THE DRAWINGS

Various features and characteristics of the inventions described in this specification may be better understood by reference to the accompanying figures, in which.

DETAILED DESCRIPTION

Figure 1:
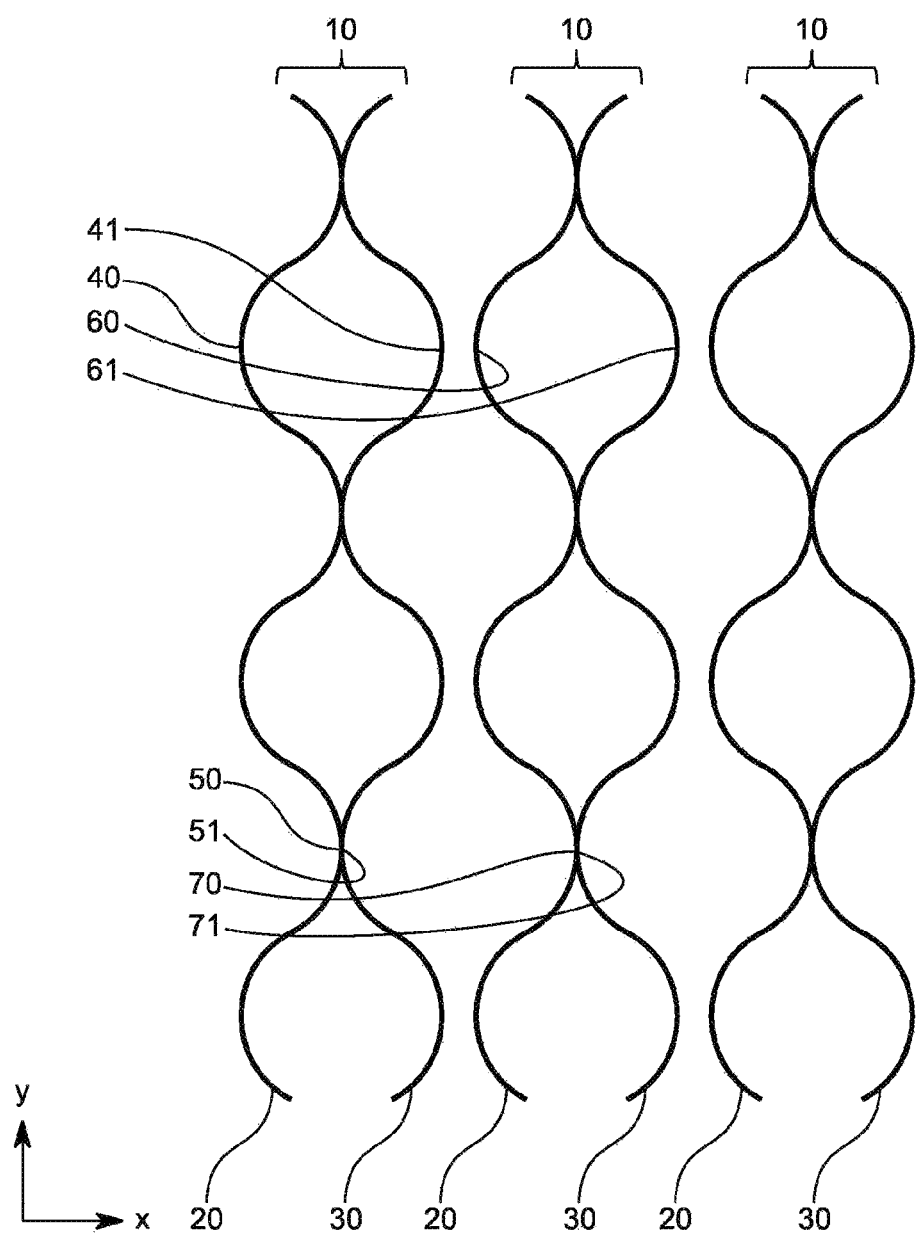
FIG. 1 is a cross-sectional view of a first body of the invention.

The object is achieved in the invention via a body as claimed in claim 1, a process as claimed in claim 8 and a device as claimed in claim 13. Advantageous embodiments can be found in the dependent claims. Unless clearly otherwise apparent from the context, they can be combined in any desired manner.

The invention therefore proposes a deformable body, where the body is composed of a plurality of layers of a polymeric construction material and where a construction direction perpendicular to the layers is defined. The body comprises layers with a plurality of curve pairs which are formed by the construction material and which are in periodic contact with one another.

Because the deformable body of the invention is constructed from curve pairs, its compressive hardness in propagation direction of the curve pairs can differ from that perpendicularly to said propagation direction. Dynamic compression properties can moreover be adjusted via the individual design of the curves. The same applies to deflection of the direction of compression into a predetermined direction.

The term "deformable" in particular means that the compressive strength (40% compression, DIN EN ISO 3386-1:2010-09) of the body in at least one spatial direction is ≥10 to ≤1000 kPa, preferably ≥20 to ≤700 kPa and more preferably ≥30 to ≤500 kPa.

Within the body of the invention it is possible to define channels through which ventilation can be achieved. Another result of the structure of the body is that, unlike porous material such as foams, the body can be successfully cleaned by washing. It is likewise easy to integrate electronic elements, for example sensors or actuators.

The number of curve pairs in a layer of the body can by way of example be ≥10 to ≤100 curve pairs per meter (perpendicularly to the propagation direction of the curve pairs). The maximal separation of the corresponding sections of the curves in the curve pair can by way of example be ≥5 mm to ≤100 mm, preferably ≥10 mm to ≤50 mm and more preferably ≥15 mm to ≤30 mm.

Contact between curve pairs in the body of the invention is to be regarded as a coherent connection.

The curve pairs which are in periodic contact with one another can be present in a portion of the layers in the body of the invention or else in all of its layers.

The body of the invention can be compressed in accordance with its intended use as supporting element and/or bearing element. The compressive strength of the body in at least one spatial direction (40% compression, DIN EN ISO 3386-1:2010-09) is ≥10 to ≤1000 kPa, preferably ≥20 to ≤700 kPa and more preferably ≥30 to ≤500 kPa.

The envelope density of the body of the invention can, in accordance with its intended use as supported and/or bearing element, be 30-800 g/l, preferably 50-500 g/l and particularly preferably 80-400 g/l.

It is possible that the compressive strength (40% compression, DIN EN ISO 3386-1:2010-09) of the body in a selected spatial direction deviates by ≥10%, preferably ≥15% to ≤400%, more preferably ≥20% to ≤200%, from the compressive strength (40% compression, DIN EN ISO 3386-1:2010-09) of the body in a spatial direction perpendicular to the selected spatial direction.

It is preferable that the body is formed at least to some extent from a material having one or more of the following properties:
   tan δ value (20° C., DMA, DIN EN ISO 6721)≥0.01 to ≤1, preferably ≥0.05 to ≤0.8, more preferably ≥0.1 to ≤0.5
   Maximum tan δ value (DMA, DIN EN ISO 6721) at ≥−40° C. to ≤150° C., preferably ≥−20° C. to ≤80° C., more preferably ≥−10° C. to ≤60° C.
   modulus of elasticity (DIN EN ISO 604:2003-12) of ≥10 MPa to ≤2000 MPa, preferably ≥20 MPa to ≤1000 MPa, more preferably ≥30 MPa to ≤800 MPa, very particularly preferably ≥40 MPa bis ≤400 MPa.
   a Shore hardness in accordance with DIN ISO 7619-1:2012-02 of ≥40 A to ≤85 D, preferably ≥70 Shore A to ≤65 Shore D, more preferably ≥80 Shore A to ≤98 Shore A.
   melting point (DIN EN ISO 11357-3:2013-04) of ≤280° C., preferably ≥30° C. to ≤250° C., more preferably ≥40° C. to ≤200° C.
   glass transition temperature $T_g$ (DMA, DIN EN ISO 6721) of ≤200° C., preferably ≥−50° C. to ≤160° C., more preferably ≥−20° C. to ≤80° C.

In a preferred embodiment, the body comprises layers with a plurality of curve pairs which are formed by the construction material and which run parallel to one another,
   the curve pairs respectively comprise two periodic curves running in opposition to one another,
   the curve pairs comprise sections of maximal separation from one another and sections of minimal separation from one another,
   in a portion of the layers in adjacent curve pairs at least one section of maximal separation of a curve is connected to a section of maximal separation of an adjacent curve,
   in another portion of the layers in adjacent curve pairs at least one section of maximal separation of a curve is not connected to a section of maximal separation of an adjacent curve,
   in another portion of the layers in adjacent curve pairs at least some of the sections of minimal separation are connected to one another and
   in another portion of the layers in adjacent curve pairs at least some of the sections of minimal separation are not connected to one another.

Parallel curve pairs share a propagation direction within a plane. It is preferable that the propagation directions are completely identical, but there can also be an angle <10° between the propagation vectors of the curve pairs.

For the purposes of the present invention, opposed curves are curves which run within a shared plane and which within this plane proceeds simultaneously either toward one another or away from one another. The curve pairs can run in perfect opposition, i.e. with no displacement in relation to one another, or the two curves which make the curve pair can be displaced in relation to one another in propagation direction. This phase displacement can by way of example be >0 to <π/2, preferably ≥π/32 to ≤π/4.

In another preferred embodiment, the following layer group, interconnected in construction direction at least to some extent, is repeated at least once in construction direction:
   one or more layers in which in curve pairs at least some of the sections of minimal separation of curves are connected to one another;
   one or more layers in which in curve pairs the curves are not connected to one another and not connected to curves of adjacent curve pairs; and
   one or more layers in which in adjacent curve pairs at least one section of maximal separation of a curve is connected to a section of maximal separation of an adjacent curve.

In another preferred embodiment, the separation of the curves from one another in a curve pair is at least to some extent periodically variable in construction direction in the individual layers. It is preferable that the proportion of the curve pairs with periodically variable separation from one another is ≥50%, more preferably ≥75% and particularly preferably ≥95% of the total number of curve pairs.

In another preferred embodiment, at least in a portion of the curve pairs there are curves present which have the same maximal amplitude. It is preferable that the proportion of the curve pairs having the same maximal amplitude is ≥50%, more preferably ≥75% and particularly preferably ≥95% of the total number of curve pairs.

In another preferred embodiment, at least in a portion of the curve pairs there are curves present which do not have the same maximal amplitude. It is then preferable that the portion of the curve pairs which do not have the same maximal amplitude is ≥50%, more preferably ≥75% and particularly preferably ≥95% of the total number of curve pairs.

In another preferred embodiment, in at least one layer, points where the curves are connected among one another and/or to one another form a periodically repeating pattern. If the points of connection are distributed in a periodically repeated manner within a volume, crystallographic terms can be used to describe this circumstance. The points of connection can be arranged in accordance with the 14 Bravais lattices: simple cubic (sc), body-centered cubic (bcc), face-centered cubic (fcc), simple tetragonal, body-centered tetragonal, simple orthorhombic, base-centered orthorhombic, body-centered orthorhombic, face-centered orthorhombic, simple hexagonal, rhombohedral, simple monoclinic, base-centered monoclinic and triclinic. Preference is given to the cubic lattices sc, fcc and bcc.

In another preferred embodiment, in at least one layer the curves in at least one curve pair are described via a sine function. Functions included here are those of the type $f(x) = a \sin(\omega x + \varphi)$, where the scaling factor is $a$, the frequency is $\omega$ and the phase displacement is $\varphi$.

In another preferred embodiment, the polymeric construction material comprises a thermoplastic, preferably a thermoplastic elastomer, more preferably selected from the group of: thermoset polyurethane elastomers (PUR), thermoplastic copolyamides (TPA), thermoplastic copolyesters (TPC), thermoplastic elastomers based on olefins (TPO), styrene block copolymers (TPS), thermoplastic elastomers based on urethane (TPU), crosslinked thermoplastic elastomers based on olefins (TPV), thermoplastic elastomers based on polyvinyl chloride (PVC), thermoplastic elastomers based on silicone, and combinations of at least two of these elastomers. Combinations of ≥3, ≥4 or ≥5 of se thermoplastic elastomers are also possible; in yet another preferred embodiment, the polymeric construction material comprises a thermoplastic vulcanizate, and in yet another preferred embodiment the polymeric construction material comprises a vulcanizable rubber.

For the purposes of the present invention, a polymer is elastic if its elongation at break in the tensile test in accordance with DIN 53504 is ≥50%. The compression set of the required body after 40% compression (DIN ISO 815-1) can then by way of example be ≤50%, preferably <30% and particularly preferably <10%.

The elastic polymer can also comprise further additives such as fillers, stabilizers and the like, and also further polymers. The total content of additives in the elastic polymer can by way of example be ≥0.1% by weight to ≤70% by weight, preferably ≥1% by weight to ≤40% by weight.

In another preferred embodiment, the at least one thermoplastic is a thermoplastic elastomer with Shore A hardness in accordance with DIN ISO 7619-1 of ≥40 to ≤98 (preferably ≥50 to ≤95, more preferably ≥60 to ≤92). The melting range (DSC, differential scanning calorimetry; second heating pass with heating rate 5 K/min) of the elastomer can moreover be ≥20° C. to ≤250° C. (preferably ≥40° C. to ≤200° C., more preferably ≥50° C. to ≤180° C.), and/or its melt volume rate (MVR) in accordance with ISO 1133 (190° C., 10 kg) can be ≥25 to ≤90 (preferably ≥30 to ≤80, more preferably ≥35 to ≤65) cm³/10 min.

This DSC analysis subjected the material to the following temperature cycle: 1 minute at minus 60° C., then heating to 250° C. at 5 K/minute, then cooling to minus 60° C. at 5 K/minute, then 1 minute at minus 60° C., then heating to 250° C. at 5 K/minute.

In another preferred embodiment, the elastomer is a thermoplastic elastomer with melting range (DSC, differential scanning calorimetry; second heating pass with heating rate 5 K/min)≥20° C. to ≤200° C. (preferably ≥40° C. to ≤190° C., more preferably ≥70° C. to ≤180° C.), Shore A hardness in accordance with DIN ISO 7619-1≥40 to ≤98 (preferably ≥50 to ≤95, more preferably ≥60 to ≤90); melt voltage rate (MVR) at temperature T in accordance with ISO 1133 (10 kg) 5 to 15 (preferably ≥6 to ≤12, more preferably ≥7 to ≤10) cm³/10 min, and a change of melt volume rate (10 kg) of ≤90 (preferably ≤70, more preferably ≤50) cm³/10 min when said temperature T is increased by 20° C.

This DSC analysis subjected from the material to the following temperature cycle: 1 minute at minus 60° C., then heating to 200° C. at 5 K/minute, then cooling to minus 60° C. at 5 K/minute, then 1 minute at minus 60° C., then heating to 200° C. at 5 K/minute.

This thermoplastic elastomer, preferably a thermoplastic polyurethane elastomer, has uniform melting characteristics. Melting characteristics are determined via the change in MVR (melt volume rate) to ISO 1133 with a preheating time of 5 minutes and 10 kg load as a function of temperature. Melting characteristics are considered to be "uniform" when the MVR at a starting temperature $T_x$ has a starting value of 5 to 15 cm³/10 min and increases by not more than 90 cm³/10 min as a result of an increase in temperature by 20° C. to $T_{x+20}$.

In another preferred embodiment, the elastomer is a thermoplastic polyurethane elastomer obtainable from the reaction of the following components:
  a) at least one organic diisocyanate
  b) at least one compound having isocyanate-reactive groups and having number-average molar mass ($M_n$) of ≥500 g/mol to ≤6000 g/mol and number-average functionality of the entirety of the components b) of ≥1.8 to ≤2.5
  c) at least one chain extender having molecular mass (Mn) 60-450 g/mol and number-average functionality of the entirety of the chain extenders c) of 1.8 to 2.5.

For synthesis of this thermoplastic polyurethane elastomer (TPU), specific examples of isocyanate components a) include: aliphatic diisocyanates such as ethylene diisocyanate, tetramethylene 1,4-diisocyanate, hexamethylene 1,6-diisocyanate, dodecane 1,12-diisocyanate, cycloaliphatic diisocyanates such as isophorone diisocyanate, cyclohexane 1,4-diisocyanate, 1-methylcyclohexane 2,4-diisocyanate and 1-methylcyclohexane 2,6-diisocyanate and the corresponding isomer mixtures, dicyclohexylmethane 4,4'-diisocyanate, dicyclohexylmethane 2,4'-diisocyanate and dicyclohexylmethane 2,2'-diisocyanate and the corresponding isomer mixtures, and also aromatic diisocyanates such as tolylene 2,4-diisocyanate, mixtures of tolylene 2,4-diisocyanate and tolylene 2,6-diisocyanate, diphenylmethane 4,4'-diisocyanate, diphenylmethane 2,4'-diisocyanate and diphenylmethane 2,2'-diisocyanate, mixtures of diphenylmethane 2,4'-diisocyanate and diphenylmethane 4,4'-diisocyanate, urethane-modified liquid diphenylmethane 4,4'-diisocyanates or diphenylmethane 2,4'-diisocyanates, 4,4'-diisocyanato-1,2-diphenylethane and naphthylene 1,5-diisocyanate. Preference is given to use of hexamethylene 1,6-diisocyanate, cyclohexane 1,4-diisocyanate, isophorone diisocyanate, dicyclohexylmethane diisocyanate, diphenylmethane diisocyanate isomer mixtures with more than 96% by weight content of diphenylmethane 4,4'-diisocyanate, and in particular diphenylmethane 4,4'-diisocyanate and naphthylene 1,5 diisocyanate. These diisocyanates can be used individually or in the form of mixtures with one another. They may also be used together with up to 15 mol % (based on total diisocyanate) of a polyisocyanate, but the quantity of polyisocyanate added must not exceed the quantity that still permits production of a product that is thermoplastic and is processable. Examples of polyisocyanates are triphenylmethane 4,4',4"-triisocyanate and polyphenylpolymethylene polyisocyanates.

Examples that may be mentioned of longer-chain isocyanate-reactive compounds b) are those having on average at least 1.8 to 3.0 Zerewitinoff-active hydrogen atoms and number-average molar mass 500 to 10 000 g/mol. These include, in addition to compounds having amino groups, thiol groups or carboxy groups, especially compounds having two to three, preferably two, hydroxy groups, specifically those having number-average molar masses Mn 500 to 6000 g/mol, particularly preferably those having a number-average molar mass Mn 600 to 4000 g/mol, for example hydroxylated polyester polyols, polyether polyols, polycarbonate polyols and polyester polyamides. Suitable polyesterdiols can be produced by reacting one or more alkylene oxides having 2 to 4 carbon atoms in the alkylene moiety with a starter molecule containing two active hydrogen atoms. Examples that may be mentioned of alkylene oxides are: ethylene oxide, propylene 1,2-oxide, epichlorohydrin and butylene 1,2-oxide and butylene 2,3-oxide. Preference is given to use of ethylene oxide, propylene oxide and mixtures of propylene 1,2-oxide and ethylene oxide. The alkylene oxides can be used individually, in alternating succession or as mixtures. Starter molecules that can be used are by way of example water, amino alcohols such as N-alkyldiethanolamines, for example N-methyldiethanolamine, and diols such as ethylene glycol, propylene 1,3-glycol, butane-1,4-diol and hexane-1,6-diol. It is also optionally possible to use mixtures of starter molecules. Other suitable polyetherdiols are the hydroxylated polymerization products of tetrahydrofuran. It is also possible to use trifunctional polyethers in proportions of 0% to 30% by weight, based on the bifunctional polyetherdiols, but the quantity used must be no greater than the quantity that still gives a product that is thermoplastically processable. The number-average molar masses n of the in essence linear polyetherdiols are preferably 500 to 6000 g/mol. They can be used either individually or in the form of mixtures with one another.

Suitable polyesterdiols can by way of example be produced from dicarboxylic acids having 2 to 12 carbon atoms, preferably 4 to 6 carbon atoms, and polyhydric alcohols. Examples of dicarboxylic acids that can be used are: aliphatic dicarboxylic acids such as succinic acid, glutaric acid, adipic acid, suberic acid, azelaic acid and sebacic acid, and aromatic dicarboxylic acids such as phthalic acid, isophthalic acid and terephthalic acid. The dicarboxylic acids may be used individually or as mixtures, for example in the form of a succinic, glutaric and adipic acid mixture. The polyesterdiols can optionally advantageously be produced by using, instead of the dicarboxylic acids, the corresponding dicarboxylic acid derivatives, for example carboxylic diesters having 1 to 4 carbon atoms in the alcohol moiety, carboxylic anhydrides or acyl chlorides. Examples of polyhydric alcohols are glycols having 2 to 10, preferably 2 to 6, carbon atoms, for example ethylene glycol, diethylene glycol, 1,4-butanediol, 1,5-pentanediol, 1,6-hexanediol, 1,10-decanediol, 2,2-dimethyl-1,3-propanediol, 1,3-propanediol or dipropylene glycol. As required by the properties desired, the polyhydric alcohols may be used alone or in a mixture with one another. Also suitable are esters of carbonic acid with the diols mentioned, in particular those having 4 to 6 carbon atoms, for example 1,4-butanediol or 1,6-hexanediol, condensation products of ω-hydroxycarboxylic acids such as ω-hydroxycaproic acid, or polymerization products of lactones, for example optionally substituted ω-caprolactone. The following are preferably used as polyesterdiols: ethanediol polyadipates, 1,4-butanediol polyadipates, ethanediol 1,4-butanediol polyadipates, 1,6-hexanediol neopentyl glycol polyadipates, 1,6-hexanediol 1,4-butanediol polyadipates and polycaprolactones. The number-average molar masses Mn of the polyesterdiols are preferably 450 to 6000 g/mol, and these compounds can be used individually or in the form of mixtures with one another.

The chain extenders c) have an average of 1.8 to 3.0 Zerewitinoff-active hydrogen atoms, their molar mass being 60 to 450 g/mol. The intended compounds here are not only those having amino groups, thiol groups or carboxy groups but also compounds having two to three, preferably two hydroxy groups.

Chain extenders preferably used are aliphatic diols having 2 to 14 carbon atoms, for example ethanediol, 1,2-propanediol, 1,3-propanediol, 1,4-butanediol, 2,3-butanediol, 1,5-pentanediol, 1,6-hexanediol, diethylene glycol and dipropylene glycol. Also suitable, however, are diesters of terephthalic acid with glycols having 2 to 4 carbon atoms, for example terephthalic acid bis(ethylene glycol) or terephthalic acid 1,4-butanediol, hydroxyalkylene ethers of hydroquinone, for example 1,4-di(b-hydroxyethyl)hydroquinone, ethoxylated bisphenols, for example 1,4-di(b-hydroxyethyl)bisphenol A, (cyclo)aliphatic diamines, for example isophoronediamine, ethylenediamine, propylene-1,2-diamine, propylene-1,3-diamine, N-methylpropylene-1,3-diamine, N,N'-dimethylethylenediamine and aromatic diamines such as tolylene-2,4-diamine, tolylene-2,6-diamine, 3,5-diethyltolylene-2,4-diamine or 3,5-diethyltolylene-2,6-diamine or primary mono-, di-, tri- or tetraalkyl-substituted 4,4'-diaminodiphenylmethanes. Chain extenders used with particular preference are ethanediol, butane-1,4-diol, hexane-1,6-diol, 1,4-di(β-hydroxyethyl)hydroquinone and 1,4-di(β-hydroxyethyl)bisphenol A. Mixtures of the abovementioned chain extenders can also be employed.

It is also possible to add relatively small quantities of triols.

Compounds monofunctional toward isocyanates can be used as what are known as chain terminators in proportions up to 2% by weight based on TPU. Suitable examples are monoamines such as butyl- and dibutylamine, octylamine, stearylamine, N-methylstearylamine, pyrrolidine, piperidine and cyclohexylamine, monoalcohols such as butanol, 2-ethylhexanol, octanol, dodecanol, stearyl alcohol, the various amyl alcohols, cyclohexanol and ethylene glycol monomethyl ether.

When the intention is to produce thermoplastically processible polyurethane elastomers, selection of the isocyanate-reactive substances should preferably be such that their number-average functionality does not substantially exceed two. If compounds of higher functionality are used, overall functionality should be correspondingly reduced by use of compounds with functionality <2.

Selection of the relative quantities of isocyanate groups and isocyanate-reactive groups is preferably such that the ratio is 0.9:1 to 1.2:1, preferably 0.95:1 to 1.1:1.

The thermoplastic polyurethane elastomers that can be used in the invention can comprise, as auxiliaries and/or additional substances, to at most 20% by weight, based on the total quantity of TPU, of the usual auxiliaries and additional substances. Typical auxiliaries and additional substances are catalysts, antiblocking agents, inhibitors, pigments, dyes, flame retardants, stabilizers in respect of aging and weathering effects and in respect of hydrolysis, light, heat and discoloration, plasticizers, lubricants and demolding agents, fungistatic and bacteriostatic substances, reinforcing agents and inorganic and/or organic fillers and mixtures of these.

Examples of the additional substances are lubricants, for example fatty acid esters, metal soaps thereof, fatty acid amides, fatty acid ester amides and silicone compounds, and reinforcing agents, for example fibrous reinforcing agents, for example inorganic fibers, which are produced according to the prior art and can also be provided with a size. Further information about the auxiliaries and additional substances mentioned may be found in the specialist literature, for example in the monograph by J. H. Saunders and K. C. Frisch "High Polymers", volume XVI, Polyurethanes, parts 1 and 2, Interscience Publishers 1962/1964, in "Taschenbuch der Kunststoff-Additive" [Handbook of plastics additives] by R. Gachter and H. Müller (Hanser Verlag Munich 1990) or in DE-A 29 01 774.

Suitable catalysts are the conventional tertiary amines known from the prior art, for example triethylamine, dimethylcyclohexylamine, N-methylmorpholine, N,N'-dimethylpiperazine, 2-(dimethylaminoethoxy)ethanol, diazabicyclo[2.2.2]octane and the like and also in particular organic metal compounds such as titanic esters, iron compounds or tin compounds such as tin diacetate, tin dioctanoate, tin dilaurate or the dialkyltin salts of aliphatic carboxylic acids, for example dibutyltin diacetate or dibutyltin dilaurate or the like. Preferred catalysts are organic metal compounds, in particular titanic esters, iron compounds and tin compounds. The total quantity of catalysts in the TPUs used is generally about 0 to 5% by weight, preferably 0 to 2% by weight, based on the total quantity of TPU.

In another preferred embodiment, the body comprises at least two different construction materials and/or the curves have different radii.

In another preferred embodiment of the component, the curve radius of the periodic curve elements does not correlate with the curve layer thickness or the curve line width. In a preferred embodiment, curve layer thickness and curve line width at different curve radii are identical, and the properties of the body that is deformable according to the invention are determined via the curve radius of the periodic curves and/or via the modulus of the material used. In a preferred embodiment, for curve radii >1.5 cm materials with modulus >300 MPa, preferably >500 MPa particularly preferably >700 MPa are used, and for curve radii <1 cm materials with modulus <800 MPa, preferably <600 MPa, particularly preferably <500 MPa are used, where each determination is of modulus of elasticity by the tensile test in accordance with DIN 53504 at 23° C.

In another preferred embodiment, at least two different geometries of the invention and/or two different curve radii are used in a component.

In another preferred embodiment, a covering encloses the body at least to some extent.

The invention moreover provides a process for the production of a deformable body of the invention, where the body is produced in an additive manufacturing process from a polymeric construction material.

In the process, the body can in particular be produced in a melt-layering process from a polymeric construction material, and the construction material can, at least one juncture, be discharged simultaneously from a plurality of printing heads.

In a preferred embodiment of the process, the following layer group, interconnected at least to some extent, is produced in at least one repetition in a construction direction:
  one or more layers in which in curve pairs at least some of the sections of minimal separation of curves are connected to one another;
  one or more layers in which in curve pairs the curves are not connected to one another and not connected to curves of adjacent curve pairs; and
  one or more layers in which in adjacent curve pairs at least one section of maximal separation of a curve is connected to a section of maximal separation of an adjacent curve.

Production of the curves in the process of the invention provides the possibility of producing the body of the invention at high printing speed in the additive manufacturing process. In particular in the FDM process, the printing head can be used productively over long distances, instead of having to be repositioned or retarded by movements with small curve radii.

In another preferred embodiment of the process, the polymeric construction material comprises a thermoplastic elastomer as described above. In order to avoid unnecessary repetition, the details relating to the thermoplastic elastomer are not repeated here.

An additive manufacturing process permits individualized adaptation of, for example, the damping properties of a body intended for use as mattress or seat cushion. Individualized means here not only that one-off articles can be produced but also that it is concomitantly possible to achieve adjustment of damping properties as desired at different points in a support element or bearing element. It is thus possible, for example, to create a mattress individually for a customer in accordance with anatomical requirements or needs. In order by way of example to achieve ideal pressure distribution for lying on the mattress, a pressure profile of the body can firstly be recorded on a sensor surface, and the data thus obtained can be used to individualize the mattress. The data are then introduced into the additive manufacturing process in a manner known per se.

The process may be selected, for example, from melt layering (fused filament fabrication, FFF, or fused deposition modelling, FDM), inkjet printing, photopolymer jetting, stereolithography, selective laser sintering, digital-light-processing-based additive manufacturing system, continuous liquid interface production, selective laser melting, binder-jetting-based additive manufacturing, multijet fusion-based additive manufacturing, high-speed sintering process and laminated object modelling. The additive manufacturing process is preferably a sintering process or a melt-layering process.

Sintering processes in the context of the present invention are processes which in particular use thermoplastic powders for layer-by-layer construction of products. Systems known as coaters are used here to apply thin powder layers, which are then selectively melted by means of an energy source. The surrounding powder here supports the geometry of the component. Complex geometries can thus be manufactured more economically than by the FDM process. It is moreover possible to arrange/manufacture various products in closely packed form in what are known as the powder bed. By virtue of these advantages, powder-based additive manufacturing processes are among the most cost-effective additive production processes available. Use of these therefore predominant among industrial users. Examples of powder-based additive manufacturing processes are what are known as laser sintering (SLS, selective laser sintering) and high-speed sintering (HSS). They differ from one another in the method used for introducing the energy into the plastic for selective melting. In the case of the layer sintering process, the energy is introduced by way of a deflected laser beam. In the case of what is known as the high-speed sintering (HSS) process, the energy is introduced by way of infrared (IR) radiant sources in combination with an IR absorber selectively printed into the powder bed. The process known as selective heat sintering (SHS) uses the printing unit of a conventional thermal printer for selective melting of thermoplastic powders. Preference is given to selective laser sintering processes (SLS).

The expression "melt-layering process" describes a manufacturing process which is classified as additive manufacturing and which can construct a workpiece layer-by-layer, for example from a fusible plastic. The plastic can be used with or without further additions such as fibers. Machines for FFF are classified as 3D printing machines. This process is based on use of heat to liquefy a material in the form of wire made of plastic or of wax. The material is finally cooled, whereupon it solidifies. The material is applied via extrusion, using a heated nozzle which is freely movable in relation to a manufacturing plane. It is possible here either that the manufacturing plane is fixed and the nozzle is freely movable or that a nozzle is fixed and that a substrate table (with a manufacturing plane) can be moved, or that both elements, nozzle and manufacturing plane, are movable. The velocity at which the substrate and nozzle are movable in relation to one another is preferably in the range 1 to 200 mm/s. Layer thickness depends on the application and is in the range 0.025 to 3 mm; the discharge diameter (nozzle outlet diameter) of the material extruded from the nozzle is typically at least 0.05 mm, preferably >0.1 mm and <2 mm, preferably >0.4 mm and <1.5 mm, preferably >0.6 mm and <1.2 mm.

The individual layers in layer-by-layer model production therefore become connected to one another to give a complex component. Construction of a body is conventionally achieved by repeatedly tracing a working plane line by line (forming a layer) and then moving the working plane upward in a "stacking" manner (forming at least one further layer on the first layer) so as to produce a shape layer-by-layer. The discharge temperature of the mixtures of substances from the nozzle can by way of example be 80° C. to 420° C. The substrate table can moreover be heated, for example to 20° C. to 250° C., and in a particular embodiment can be cooled to ≤20° C. It is thus possible to prevent excessively rapid cooling of the applied layer, thus achieving adequate connection of a further layer applied thereon to the first layer and, respectively, preventing excessively slow crystallization of the applied layer, thus providing a sufficiently firm substrate for the next layer during construction of filigree structures.

In another preferred embodiment, the construction rate of the geometries of the invention is controlled in a manner that provides a period of <20 seconds or >30 seconds, preferably <15 seconds and >50 seconds and very particularly preferably <10 seconds or >80 seconds between the layers at any desired portion of the component. In another particular embodiment, the average layer-application rate of the construction process for the geometries of the invention is controlled in a manner such that the average period required for a layer of the component is of >30 seconds, preferably >50 seconds, particularly preferably >80 seconds, particularly preferably >120 seconds and very particularly preferably >300 seconds.

In another preferred embodiment, the construction rate of the geometries is controlled in a manner such that the average deposition rate of the construction material is >10 mm/s and <500 mm/s, preferably >30 mm/s and <400 mm/s, preferably >50 mm/s, preferably >60 mm/s and <300 mm/s, preferably >70 mm/s and <150 mm/s.

In another preferred embodiment, a construction space used in the process is not subject to any particular temperature control; instead, the construction process takes place at room temperature. A typical room temperature is understood here to be a temperature of 15-30° C.

In another preferred embodiment, the 3D printing of the geometries of the invention takes place on a movable "continuous" printing platform, for example in the form of a conveyor belt, so that continuous printing is possible.

In another preferred embodiment, the additive manufacturing process is a melt-layering process.

In another preferred embodiment, the construction material in the melt-layering process is discharged from a plurality of printing heads. It is preferable that there are 5 or more printing heads here, particularly 10 or more printing heads. Construction of the body of the invention from curve pairs particularly provides opportunities for in-parallel production operations. In another preferred embodiment, for at least 50% of the time, at least 50% of the printing heads operate simultaneously on a component. Simultaneous operation of printing heads on a component during the process of the invention is easy to control by virtue of the preferably repetitive geometries via at least linear overlapping of the construction spaces of the individual printing heads.

In another preferred embodiment, at at least one juncture the construction material is discharged simultaneously from a plurality of printing heads. Preference is given to provision of the printing heads on a positioning rod for printing heads. It is preferable that there are at least 3 or at least 5 printing heads preferably mounted in offset positions and independently of one another on a movable rod, with freedom of movement controlled by way of software or hardware and by way of a minimum separation so as preferably to avoid contact between the printing heads.

In another preferred embodiment, there is/are more than 1 printing head, preferably more than 3, and particularly more than 5 printing heads, in offset and fixed positions melted on a movable rod.

In another preferred embodiment, operations are carried out in parallel in at least one spatial direction, using more than rod with more than one printing head.

In another preferred embodiment, the average printing time without interruption (where this means a stoppage of material transport for at least 0.05 seconds in an FFF process) for the geometries of the invention is >3 seconds, preferably >5 seconds and very particularly >10 seconds and/or the average printing length without interruption is >5 cm, preferably >10 cm, very particularly preferably >15 cm.

The present invention moreover provides a device for supporting and/or bearing a person, comprising a deformable body of the invention. The device of the invention can by way of example be a bed, upholstered furniture, or a vehicle seat. The device can comprise not only the deformable body of the invention, functioning as mattress or cushioned area, but also active and passive elements. Passive elements are components such as frames, joints, rollers and the like. Active elements can be servomotors, for example motors for adjusting seat geometry, sensors, or other elements which provide a desired functionality.

It is preferable that the device of the invention is a bed for hospitals and care institutions. Seats in vehicles are another preferred application sector, in particular in long-distance vehicles. The advantages of the deformable body of the invention are particularly successfully utilized in such applications, with ventilation capability not achievable in conventional foams.

In a preferred embodiment, in the body of the invention there are cutouts provided for fans and/or sensors. Fans and/or sensors can then be installed into the cutouts intended for that purpose.

In another preferred embodiment, the device of the invention moreover comprises an aerator for passing air through at least a portion of the deformable body. In the simplest case, air is conducted from the environment of the device through at least one portion of the deformable body, thus permitting easy removal of moisture discharged as a result of sweating from a person using the device and sitting or lying on the porous body. This is sufficient to increase comfort during sitting or lying.

Perceived comfort can be further increased by using one or more heating elements to heat the air above room temperature (temperature >20° C.), or by using one or more cooling elements to cool the air (temperature ≤25° C.).

The following figures provide more detail of the invention, which however is not restricted thereto. In the drawings:

FIG. 1 is a cross-sectional view of a first body of the invention

Figure 2:
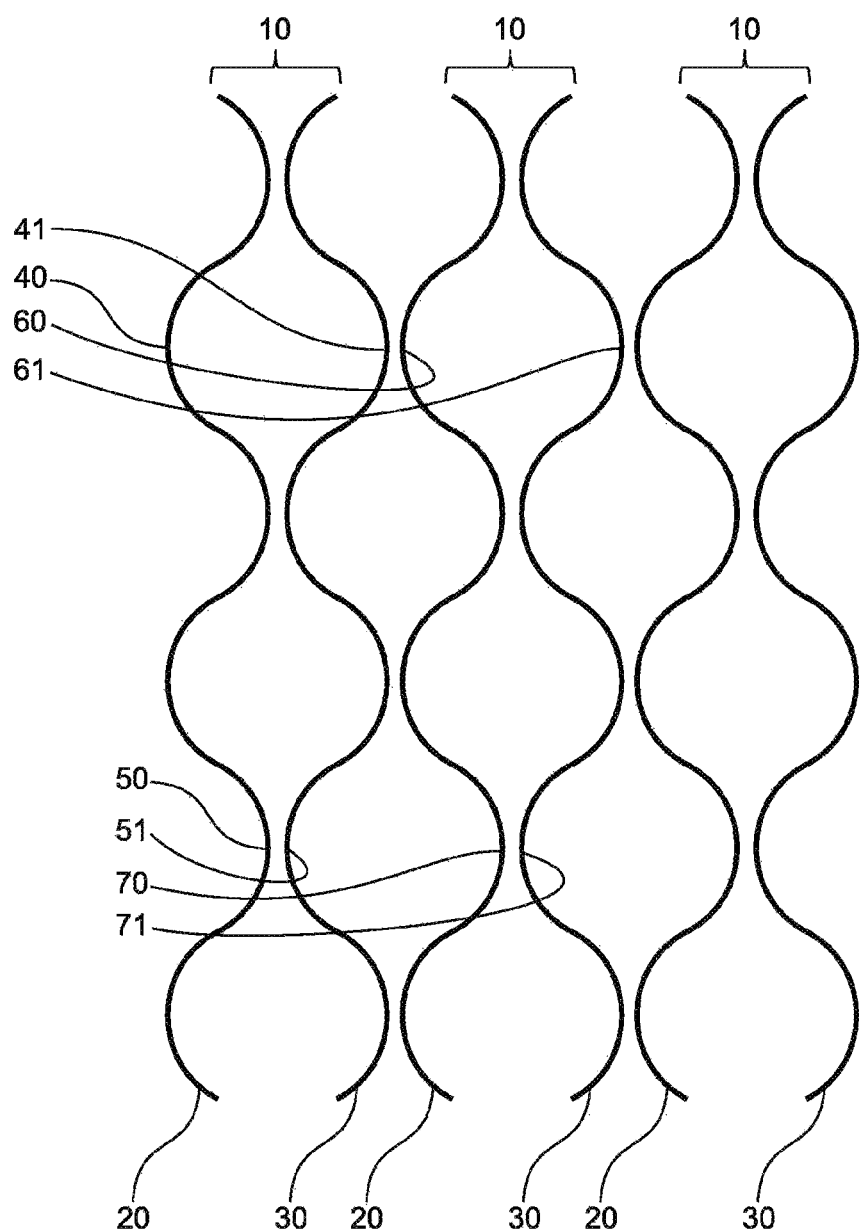
FIG. 2 is another cross-sectional view of the first body of the invention.

FIG. 2 is another cross-sectional view of the first body of the invention

Figure 3:
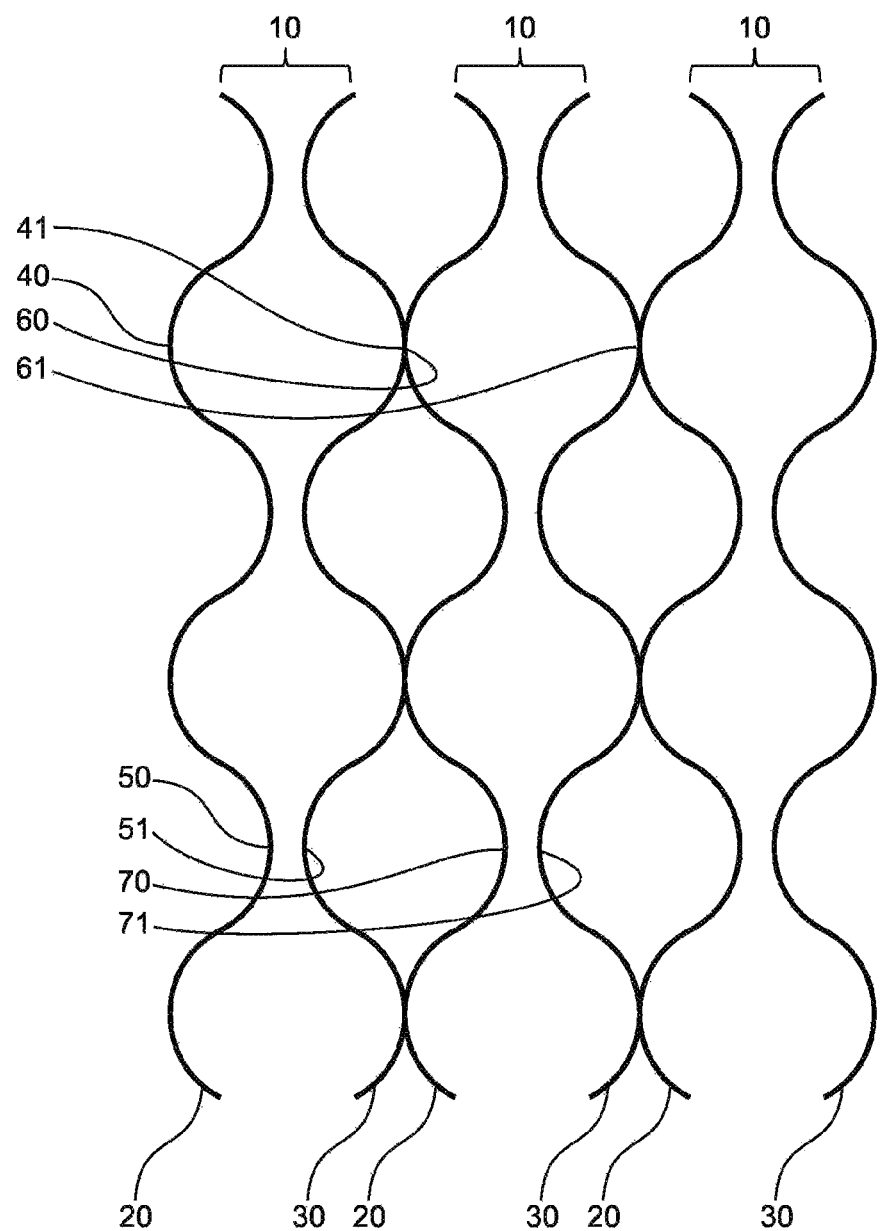
FIG. 3 is another cross-sectional view of the first body of the invention.

FIG. 3 is another cross-sectional view of the first body of the invention

Figure 4:
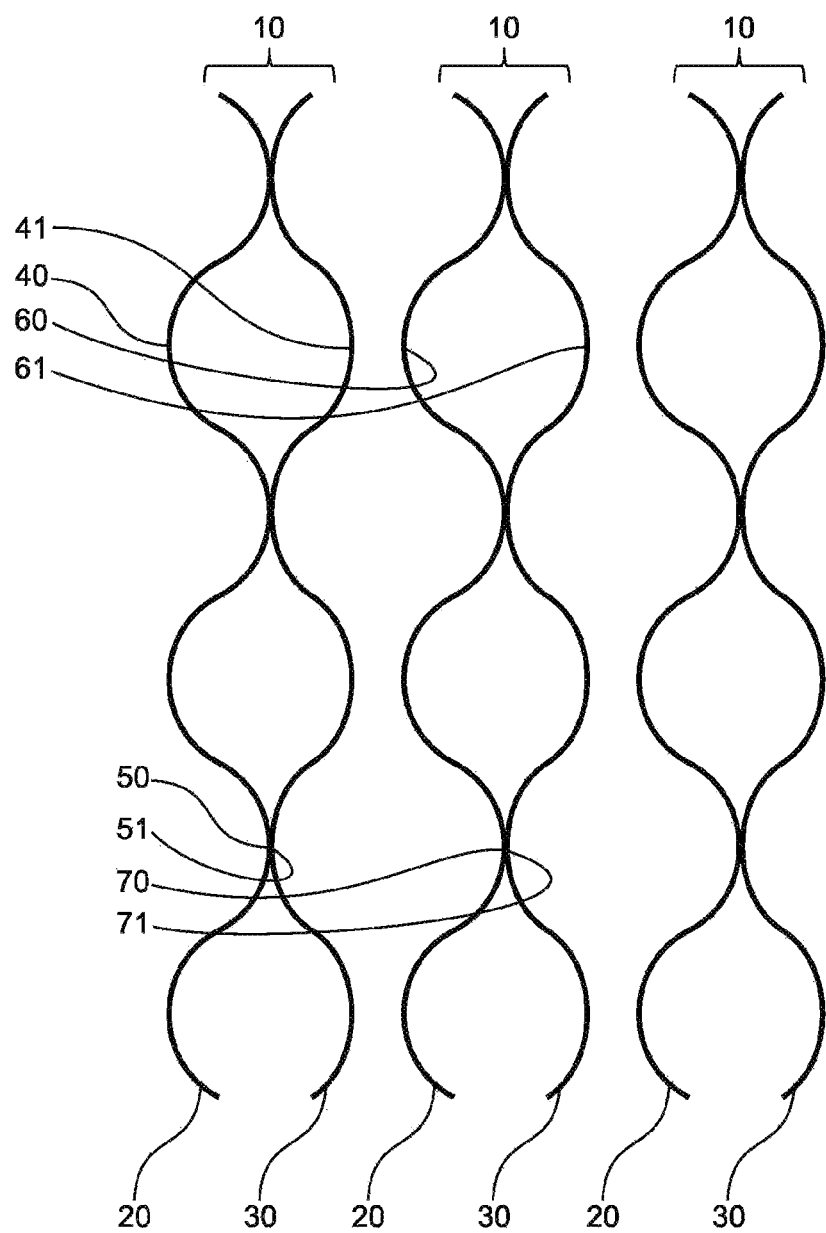
FIG. 4 is a cross-sectional view of a second body of the invention.

FIG. 4 is a cross-sectional view of a second body of the invention

Figure 5:
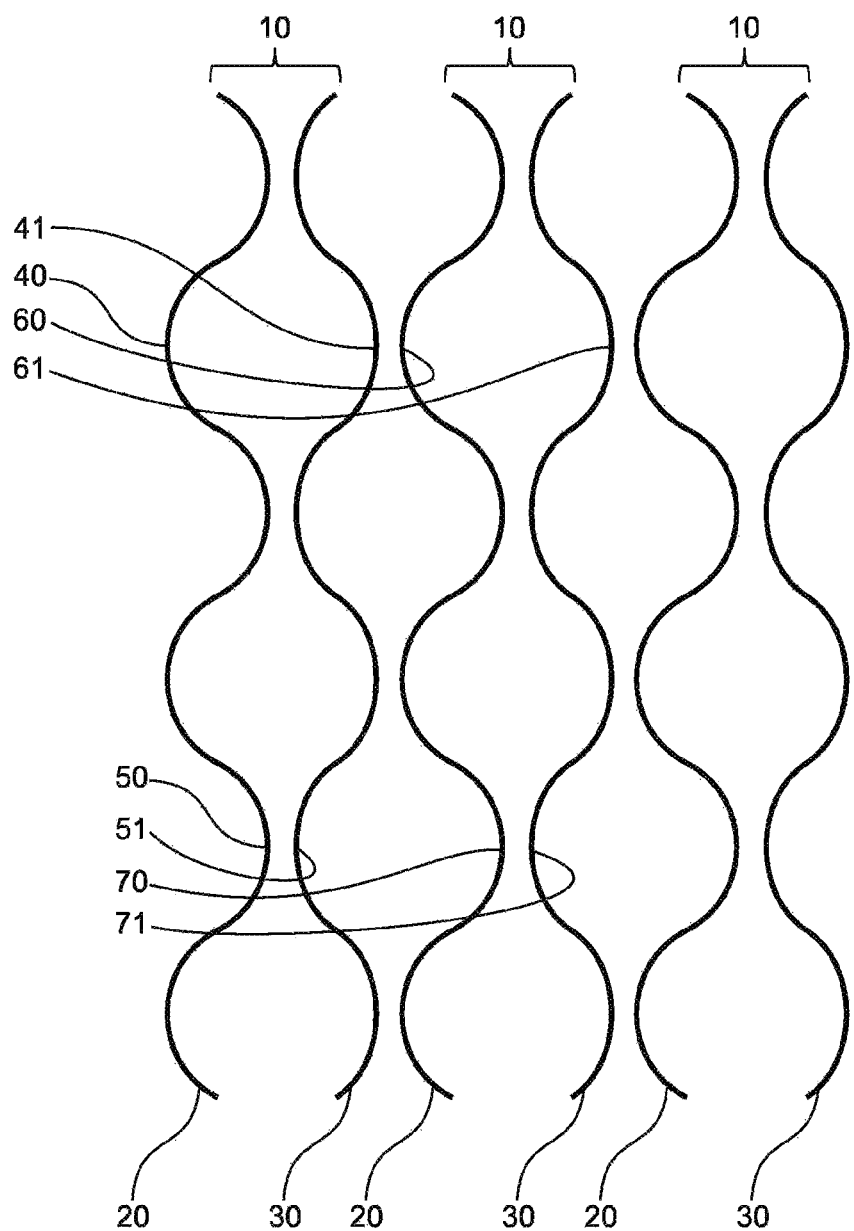
FIG. 5 is another cross-sectional view of the second body of the invention.

FIG. 5 is another cross-sectional view of the second body of the invention

Figure 6:
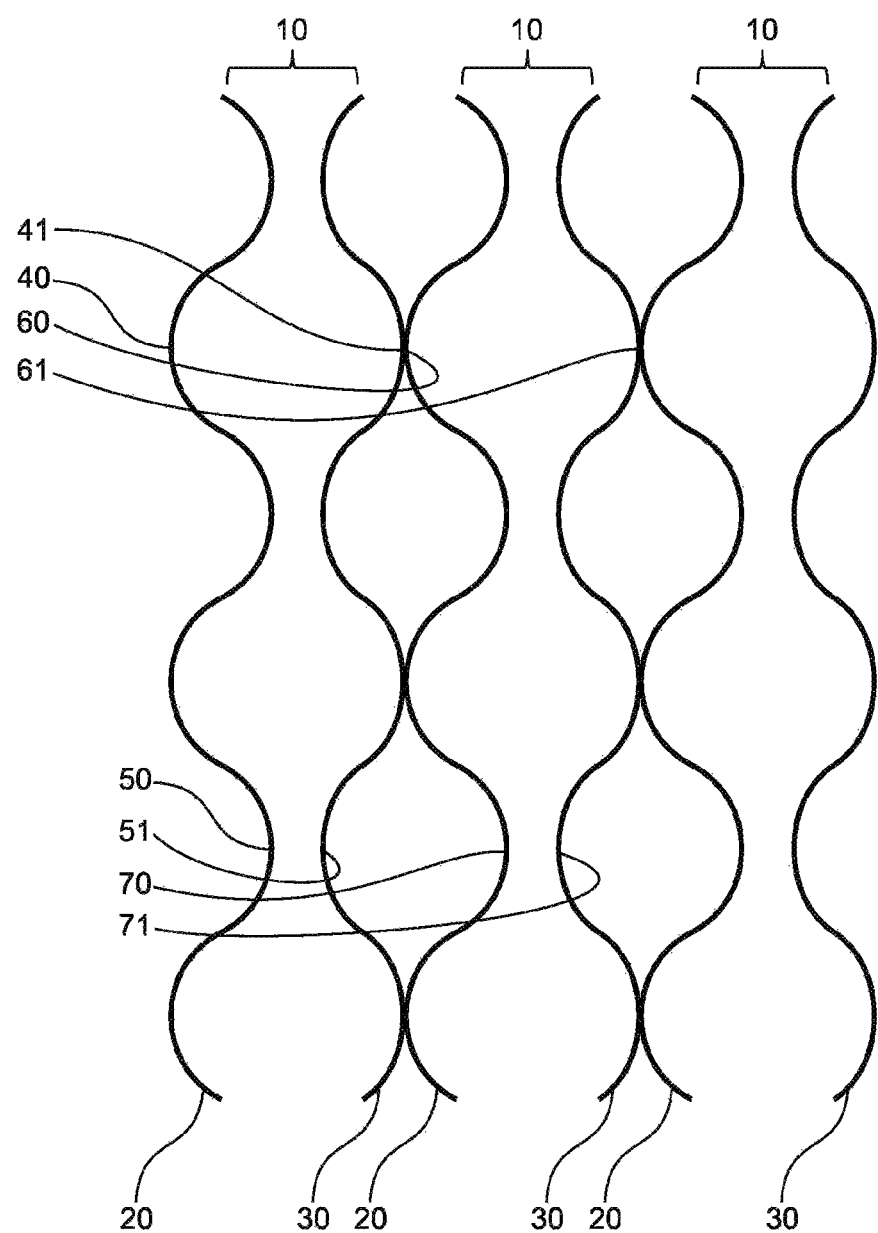
FIG. 6 is another cross-sectional view of the second body of the invention.

FIG. 6 is another cross-sectional view of the second body of the invention

Figure 7:
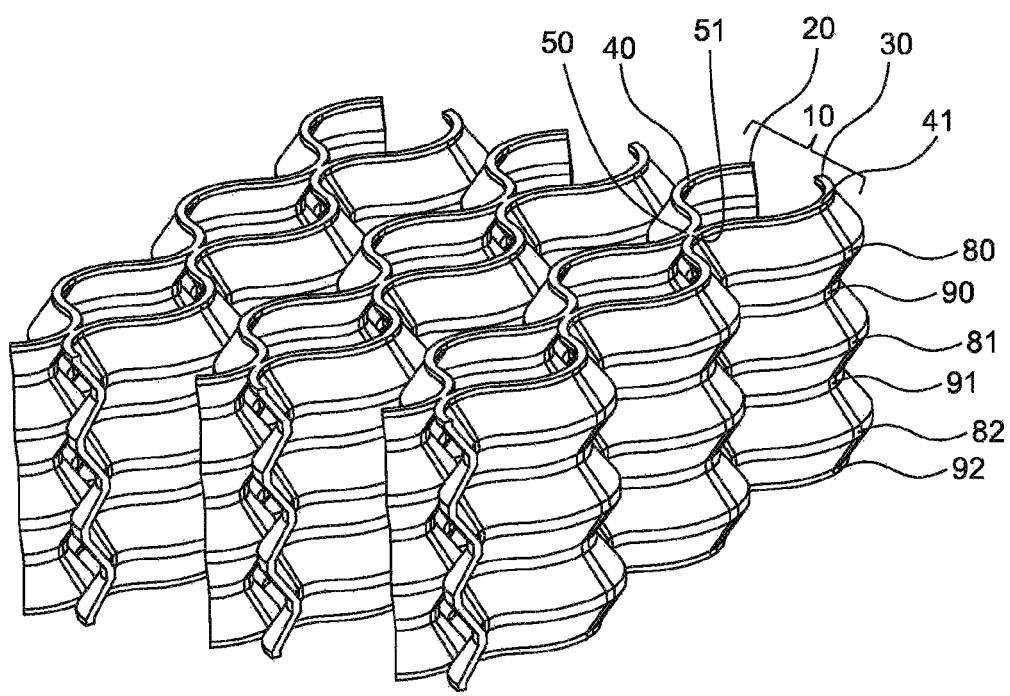
FIG. 7 is a view of a third body of the invention.

FIG. 7 is a view of a third body of the invention

Figure 8:
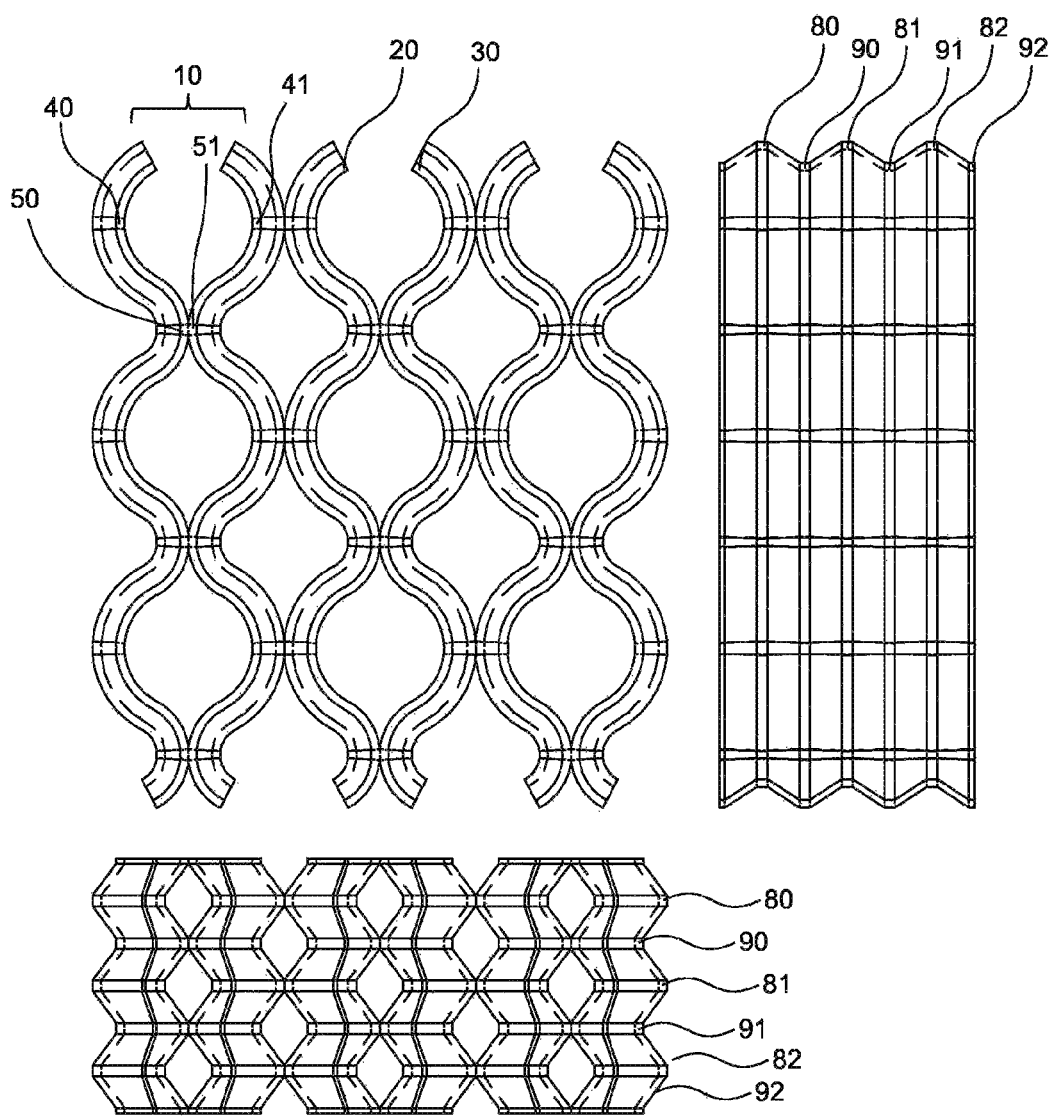
FIG. 8 is a plan view and two side views of the third body of the invention.

FIG. 8 is a plan view and two side views of the third body of the invention

Figure 9:
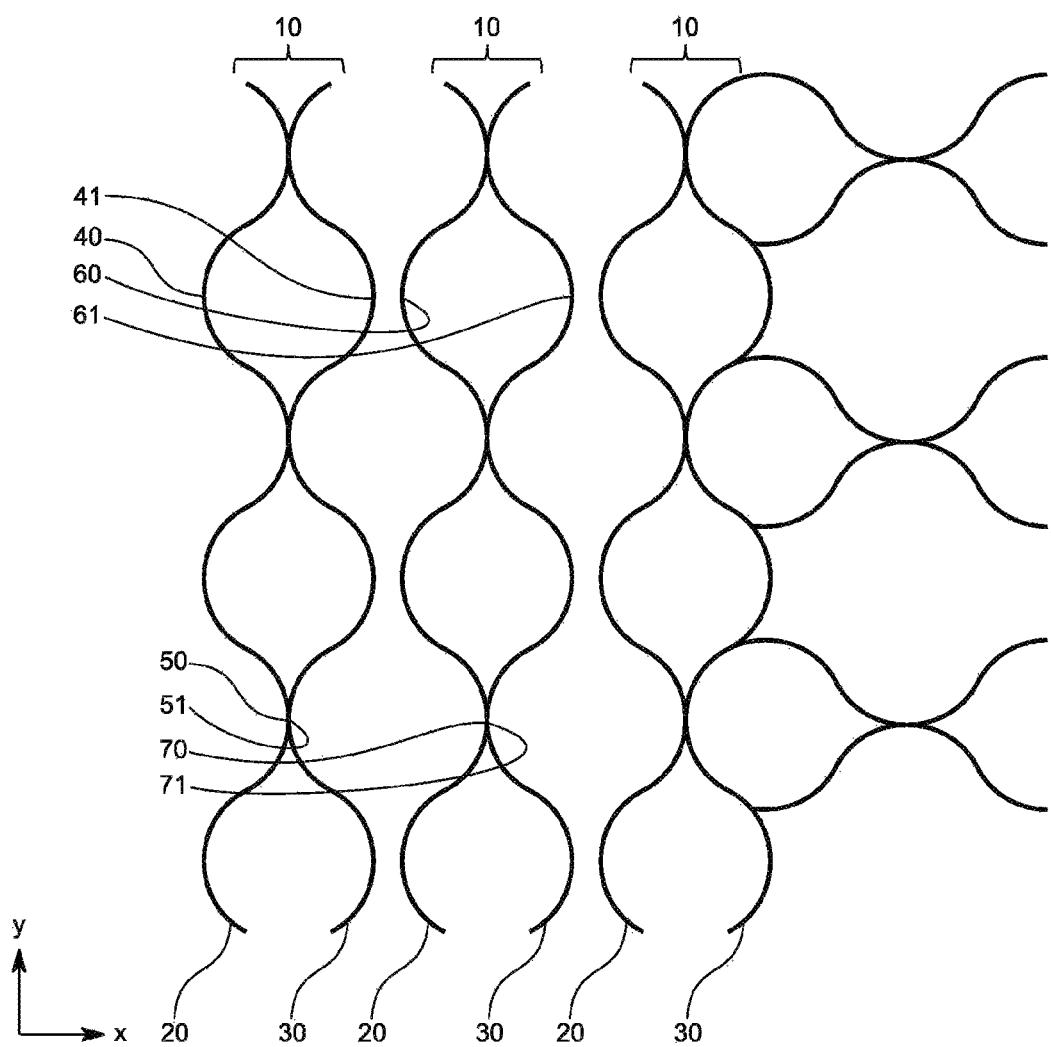
FIG. 9 is a cross-sectional view of a fourth body of the invention.

FIG. 9 is a cross-sectional view of a fourth body of the invention

Figure 10:
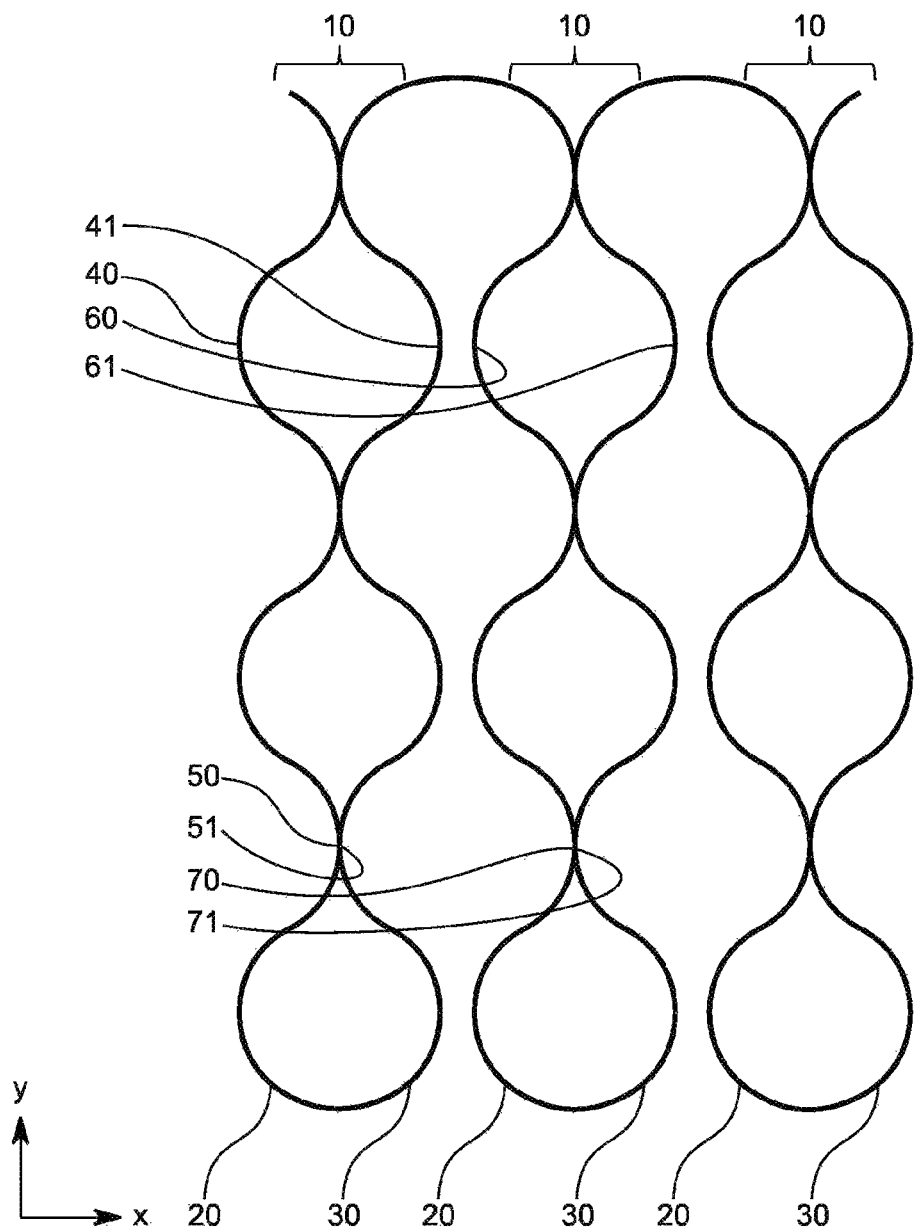
FIG. 10 is a cross-sectional view of a fifth body of the invention.

FIG. 10 is a cross-sectional view of a fifth body of the invention

Figure 11:
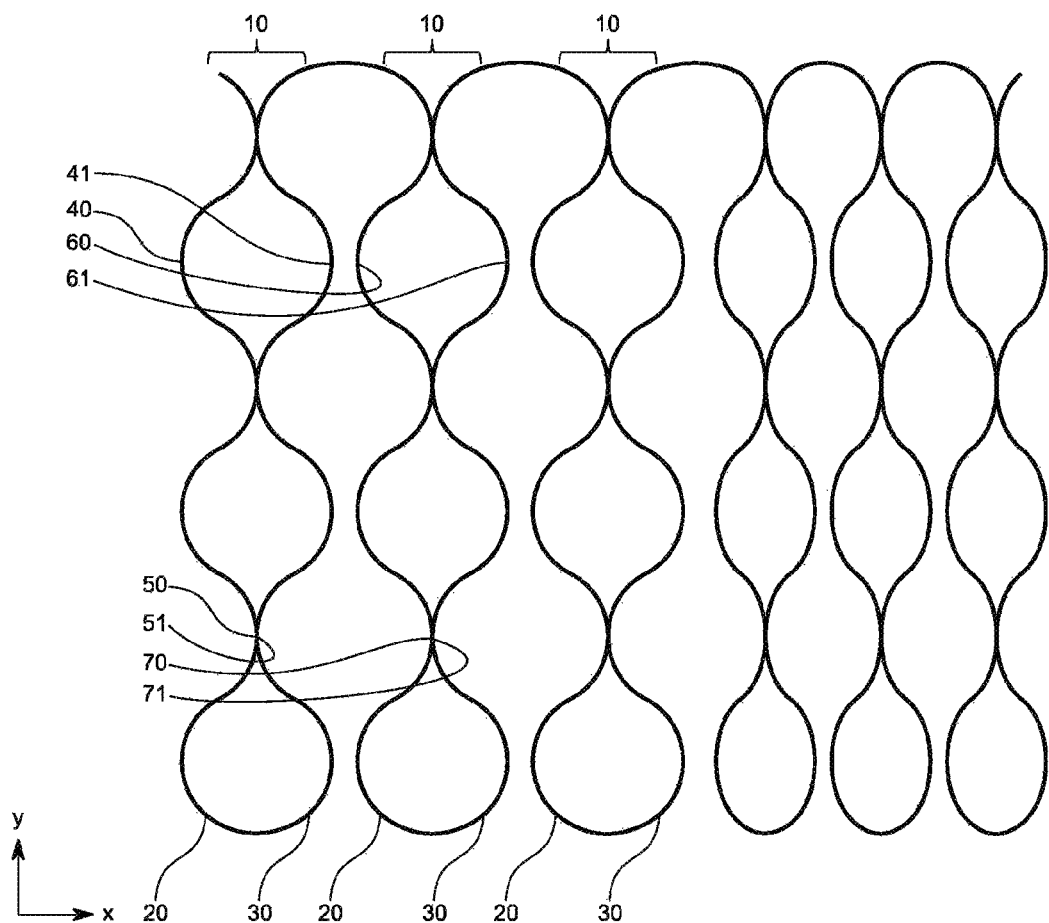
FIG. 11 is a cross-sectional view of the sixth body of the invention.

FIG. 11 is a cross-sectional view of a sixth body of the invention

Figure 12:
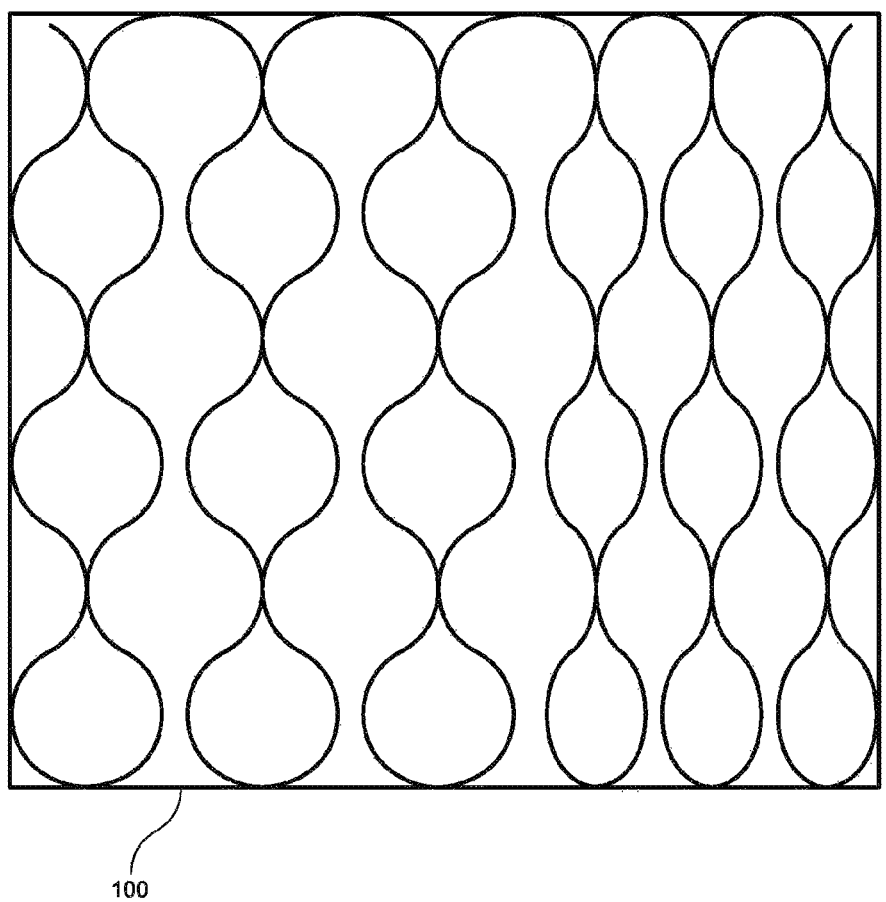
FIG. 12 is a cross-sectional view of the sixth body of the invention enclosed by a covering.

FIG. 12 is a cross-sectional view of the sixth body of the invention enclosed by a covering FIG. 1 is a diagrammatic cross-sectional view of a first deformable body of the invention. The orientations depicted in FIG. 1 for the x- and y-axis are also retained for FIGS. 2 to 6. A layer perpendicular to the construction direction (z-axis in the Cartesian coordinate system) is depicted. Within this layer there are curve pairs 10 present which in the present case run parallel to one another. Each curve pair comprises a curve 20 and a curve 30 which are formed by the construction material, for example a thermoplastic polyurethane.

The curves 20 and 30 extend in y-direction and are opposed to one another: wherever the curve 20 exhibits a deflection in −x-direction, curve 30 exhibits a deflection in +x-direction, and vice versa.

Because the curves 20 and 30 are opposed to one another, there are sections in which the curves 20 and 30 exhibit their maximal separation from one another. These are identified by the reference signs 40 and 41, and also 60 and 61. Equally, there are resultant sections in which the curves 20 and 30 exhibit their minimal separation from one another. These are correspondingly identified by the reference signs 50 and 51, and also 70 and 71.

In the layer depicted in FIG. 1, the sections with maximal separation 41 of a curve 30 are not connected to sections of maximal separation 60 of a curve 20 of the adjacent curve pair 10. However, those sections of the curves 20, 30 that have minimal separation from one another, 50, 51 and 70, 71, within the curve pairs 10, are respectively connected to one another.

FIG. 2 is another cross-sectional view of the first deformable body of the invention. When the cross section in FIG. 2 is compared with the view in FIG. 1, the difference is a different position of the former in the construction direction (z-axis). Not only are the sections of maximal separation 41 of a curve 30 not connected to sections of maximal separation 60 on a curve 20 of the adjacent curve pair 10: those sections of the curves 20, 30 that have minimal separation from one another, 50, 51 and 70, 71, within the curve pairs 10, are also not connected to one another. The cross-sectional view shown in FIG. 2 can be derived from the view in FIG. 1 in that within a curve pair 10 the x-separation of the curves 20 and 30 forming the curve pair has increased, without causing any contact with a curve of the adjacent curve pair.

FIG. 3 is another cross-sectional view of the first deformable body of the invention. When the cross section in FIG. 3 is compared with the views in FIGS. 1 and 2, the difference is a different position of the former in the construction direction (z-axis). The sections of maximal separation 41 of a curve 30 here are connected to sections of maximal separation 60 of a curve 20 of the adjacent curve pair 10; however, those sections of the curves 20, 30 with minimal separation from one another, 50, 51 and 70, 71, within the curve pairs 10, are not connected to one another. The cross-sectional view in FIG. 3 can be derived from the view in FIG. 1 in that within a curve pair 10 the x-separation of the curves 20 and 30 forming the curve pair has increased to an extent that causes contact with a curve of the adjacent curve pair.

A deformable body of the invention can therefore be constructed by a systematic method which begins by generating a layer, with an arrangement of the construction material in curves as in FIG. 1. In the next layer in construction direction, the curves 20, 30 of the respective curve pair 10 have moved away from one another by a predetermined distance, and in the next layer in construction direction they have moved away from one another by a further predetermined distance, etc. This is repeated until contact is achieved as in FIG. 3. This procedure then proceeds in construction direction, but reversed direction of movement of the curves 20, 30 in relation to one another, until contact is again obtained as in FIG. 1. The procedure is repeated until the desired article has been formed.

The manner in which the curve pairs 10 run in the deformable body of the invention illustrated by the cross-sectional views of FIG. 1 to 3 is such that the locations at which curves contact one another form the intersection points of a grid, which in the present case is rectangular. It is equally possible that the grid is an opaque grid where therefore four intersection points form a parallelogram. It is moreover possible that the distances between the intersection points of the grid within a cross-sectional plane are identical or exhibit different values.

The curve pairs 10 in the first deformable body of the invention illustrated by the cross-sectional views of FIGS. 1 to 3 comprise curves with identical absolute amplitude in x-direction. However, it is also possible that the curves which form the curve pairs 10 exhibit different amplitudes in x-direction. This is shown in FIGS. 4 to 6, which relate to a second deformable body of the invention.

The absolute amplitude value in x direction is smaller for the curves 30 than for the curves 20. In this way it is possible to achieve a further adjustment of deformation behavior when load is applied to the body of the invention, dependent on the direction of loading. A second deformable body of the invention can therefore be constructed by a systematic method which begins by generating a layer, with an arrangement of the construction material in curves as in FIG. 4. In the next layer in construction direction, the curves 20, 30 of the respective curve pairs 10 have moved away from one another by a predetermined distance; in the following layer in construction direction they have again moved away from one another by a predetermined distance, etc. This is repeated until contact as in FIG. 6 is achieved by way of an intermediate stage as in FIG. 5. This procedure then continues in construction direction with reversed direction of movement of the curves 20, 30 in relation to one another, until contact is again obtained as in FIG. 5. This is repeated until the desired article has been formed.

FIG. 7 is a three-dimensional view of a third deformable body of the invention. The layers of the construction materials can be seen, mutually superposed in construction direction and connected to one another, and comprising curve pairs 10. Individual curves 20, 30 form the curve pairs of the layers. Here again, there are defined sections with maximal separation from one another 40, 41 and defined sections with minimal separation from one another 50, 51 for the curves 20, 30 of a curve pair 10.

In the construction direction of the body, the separation of the curves 20, 30 in the curve pair 10 varies periodically with the construction direction. On that side of the body that is visible at the top in FIG. 7, the curves 20, 30 within the curve pair 10 have their smallest separation from one another so that contact can take place at the sections with minimal separation from one another 50, 51.

In the direction of the lower end of the body, the separation between the curves within the curve pairs increases within the respective plane up to a maximum 80. Since the separations likewise increase in adjacent curve pairs of the plane, contact with a curve of the adjacent curve pair is achieved.

Further in the direction of the lower end of body, the separation of the curves within the curve pairs of the respective plane decreases until contact is again achieved between the curves within the curve pair. This takes place in the plane identified by reference sign 90. The pattern—increase and decrease of the separations of the curves—is repeated in the direction of the lower end of the body, as revealed by the corresponding reference signs 81, 91, 82 and 92.

FIG. 7 also shows how points where the curves (20, 30) are connected among one another and/or one another form a periodically repeating pattern in the form of a cubic grid.

FIG. 8 is finally a plan view and two side views of the body from FIG. 7.

FIG. 9 is a cross-sectional view of a fourth deformable body of the invention. The body in FIG. 1 has been modified in a manner such that curve pairs 10 have two different propagation directions. The image depicts one propagation direction in y-direction and a second propagation direction in x-direction.

FIG. 10 is a cross-sectional view of a fifth deformable body of the invention. The body in FIG. 1 has been modified in a manner that connects curve pairs to one another and the boundaries of the body. This has the advantage that the layer of the body can be produced in one pass in a melt-layering process without interruption of the flow of material from a printing head. This increases the efficiency of the process.

FIG. 11 is a cross-sectional view of a sixth deformable body of the invention. The body in FIG. 10 has been modified in a manner that has added curve pairs with different maximal separations. Spatial variation of the compressive strength of the body can thus be achieved.

There can, of course, be a wall or covering enclosing the body of the invention at least to some extent. This is illustrated by FIG. 12, which is a cross-sectional view of the sixth body of the invention from FIG. 11 with a covering 100.

Materials of the Invention:

Example 1

TPU-1 (thermoplastic polyurethane) was produced from 1 mol of polyesterdiol (Covestro) with number-average molar mass about 2000 g/mol based on adipic acid, hexanediol and neopentyl glycol, 4.85 mol of 2,2'-(1,4-phenylenedioxy) diethanol, 5.85 mol of technical-grade diphenylmethane 4,4'-diisocyanate (MDI) with >98% by weight of 4,4'-MDI, 0.03% by weight of Irganox® 1010 (pentaerythritol tetrakis (3-(3,5-di-tert-butyl-4-hydroxyphenyl)propionate) from BASF SE) and 100 ppm of tin dioctanoate and 0.5% by weight of Loxamid 3324. The polyester polyol and the diethanol were preheated here to 200° C. and then reacted with 80% by weight of the MDI at 220° C. The reaction took place in a twin-screw extruder at 280 rpm, the remaining isocyanate (MDI) and the Loxamid 3324 being reacted during passage through the extruder. This procedure, known as "prepolymer process", is also described in "Methoden der organischen Chemie" [Methods of organic chemistry] (Houben-Weyl), vol. E 20, G. Thieme Verlag, Stuttgart, New York, 1987, pp. 1613-1617.

A polyurethane was obtained with tensile storage modulus 450 MPa at room temperature (ISO 6721-1:2018-03, ISO 6721-4:2018-03), Shore D hardness (DIN ISO 7619-1:2012-02) of an injection-molded test specimen being 60 to 64, and with reversible elongation 35-40% (DIN 53504:2017-03).

Example 2

TPU-2 was produced from 1 mol polyesterdiol (Covestro) with number-average molar mass about 900 g/mol based on about 56.7% by weight of adipic acid and about 43.3% by weight of 1,4-butanediol, 1.77 mol of 1,4-butanediol, 2.77 mol of technical-grade diphenylmethane 4,4'-diisocyanate (MDI) with >98% by weight of 4,4'-MDI, 0.05% by weight of Irganox® 1010 (pentaerythritol tetrakis(3-(3,5-di-tert-butyl-4-hydroxyphenyl)propionate) from BASF SE), 0.2% by weight of Octanol and 200 ppm of tin dioctoate by the known static-mixer-extruder process as described as "One-shot-Dosierverfahren" ["one-shot metering process"] in DE 199 24 089 C1. In the "One-shot metering process", the MDI and the polyesterdiol are homogenized with the butanediol within at most 1 second in a first static mixer (or a corresponding mixing assembly) and heated to the temperature >240° C. for completion of reaction in a second static mixer (or a corresponding heatable mixer assembly) to give the desired TPU.

A polyurethane was obtained with tensile storage modulus 95 MPa at room temperature (ISO 6721-1:2018-03, ISO 6721-4:2018-03), Shore A hardness (DIN ISO 7619-1:2012-02) of an injection-molded test specimen being 90 to 93, and with reversible elongation 30-35% (DIN 53504:2017-03).

Example 3

TPU-3 (thermoplastic polyurethane) was produced by the prepolymer process from 1 mol of polyetherdiol with number-average molar mass about 2000 g/mol based on propylene oxide, 2.81 mol of 1,4-butanediol, 0.28 mol of 1,6-hexanediol, 4.09 mol of technical-grade diphenylmethane 4,4'-diisocyanate (MDI) with >98% by weight of 4,4'-MDI, 0.3% by weight of Irganox® 1010 (pentaerythritol tetrakis (3-(3,5-di-tert-butyl-4-hydroxyphenyl)propionate) from BASF SE), 1.0% by weight of Loxamid 3324 (N,N'-ethylenebisstearylamide) and 30 ppm of Ti(IV) catalyst.

A polyurethane was obtained with tensile storage modulus 30 MPa at room temperature (ISO 6721-1:2018-03, ISO 6721-4:2018-03), Shore A hardness (DIN ISO 7619-1:2012-02) of an injection-molded test specimen being 80, and with reversible elongation 80% (DIN 53504:2017-03).

Production of Deformable Bodies:

The TPU-1, TPU-2 and TPU-3 materials were used in a Prusa i3 MK2S from Prusa Research to print structures as shown in FIG. 7, the wall thickness of the printed material being 0.4 mm. The resultant bodies could be repeated compressed to half of their dimension in all three spatial directions; when the pressure was removed from the material it reverted fully to its original shape.

What is claimed is:

1. A deformable body, comprising a plurality of layers of a polymeric construction material oriented perpendicular to a construction direction,
wherein the plurality of layers of the polymeric construction material forms a plurality of curve pairs in periodic contact with one another, wherein the plurality of curve pairs run parallel to one another,
and wherein each curve pair is formed by multiple layers of the polymeric construction material, wherein the curve pairs respectively comprise two periodic curves running in opposition to one another, wherein the curve pairs comprise sections of maximal separation between the two periodic curves and sections of minimal separation between the two periodic curves,
and wherein, in a portion of the layers:
a) at least one section of maximal separation of a curve is connected to a section of maximal separation of an adjacent curve;
b) at least one section of maximal separation of the curve is not connected to the section of maximal separation of the adjacent curve;
c) at least one section of minimal separation of the curve is connected to a section of minimal separation of the adjacent curve, and
d) at least one section of minimal separation of the curve is not connected to the section of minimal separation of the adjacent curve.

2. The body as claimed in claim 1, wherein the following layer group is at least partially interconnected in a construction direction and is repeated at least once in the construction direction:
one or more layers in which at least one section of minimal separation of the curve is connected to at least one section of minimal separation of another curve;
one or more layers in which the curves are not connected to one another and are not connected to curves of adjacent curve pairs in one or more layers; and
one or more layers in which at least one section of maximal separation of the curve is connected to the section of maximal separation of the adjacent curve in one or more layers.

3. The body as claimed in claim 1, wherein a separation of the curves from one another in the curve pair is periodically variable in a construction direction in individual layers.

4. The body as claimed in claim 1, wherein the polymeric construction material comprises at least one thermoplastic.

5. The body as claimed in claim 4, wherein the at least one thermoplastic is a thermoplastic elastomer with Shore A hardness ≥40 to ≤98 in accordance with DIN ISO 7619-1.

6. The body as claimed in claim 1, wherein a covering at least partially encloses the body.

7. A process for the production of the deformable body as claimed in claim 1, comprising producing the body in an additive manufacturing process from the polymeric construction material.

8. The process as claimed in claim 7, comprising producing the following layer group in at least one repetition in a construction direction, wherein the layer group is at least partially interconnected:
one or more layers in which at least one section of minimal separation of a curve is connected to at least one section of minimal separation of another curve;
one or more layers in which the curves are not connected to one another and not connected to curves of adjacent curve pairs; and
one or more layers in which at least one section of maximal separation of a curve is connected to a section of maximal separation of an adjacent curve.

9. The process as claimed in claim 7, wherein the polymeric construction material comprises at least one thermoplastic elastomer.

10. The process as claimed in claim 7, wherein the additive manufacturing process is a melt-layering process.

11. The process as claimed in claim 10, comprising simultaneously discharging construction material from a plurality of printing heads at one or more junctures of the body.

12. A device for supporting and/or bearing a person, comprising the deformable body as claimed in claim 1.

13. The device as claimed in claim 12, comprising a cutout for a fan, a sensor, or a combination thereof.

14. The device as claimed in claim 13, further comprising an aerator for passing air through at least a portion of the deformable body.

15. The body as claimed in claim 1, wherein each layer forms a portion of the plurality of curve pairs.

16. The body as claimed in claim 1, wherein each layer has a layer thickness of from 0.025 mm to 3 mm.

* * * * *